US Patent Number: 4,564,921
Date of Patent: Jan. 14, 1986

Suganuma

[54] FULL ADDER
[75] Inventor: Kazuo Suganuma, Yokohama, Japan
[73] Assignee: Tokyo Shibaura Kenki Kabushiki Kaisha, Japan
[21] Appl. No.: 499,872
[22] Filed: Jun. 1, 1983
[30] Foreign Application Priority Data Jun. 3, 1982 [JP] Japan .................................. 57-95395

[51] Int. Cl.$^4$ .............................................. G05F 7/50
[52] U.S. Cl. ..................................... 364/784; 307/472
[58] Field of Search ............................... 364/784–786; 307/448, 451, 472

[56] References Cited

U.S. PATENT DOCUMENTS 3,766,371 10/1973 Suzuki .................................. 364/784
3,767,906 10/1973 Pryor .................................... 364/786
4,071,905 1/1978 Oguchi et al. ....................... 364/784

OTHER PUBLICATIONS

Japanese Patent Publication (KoKoKu) No. 49-34259 "Logical Circuit".
Ohwada et al., "LSI's for Digital Signal Processing," IEEE Journal of Solid-State Circuits, vol. SC-14, No. 2, Apr. 1979.

Primary Examiner—James D. Thomas
Assistant Examiner—Dale M. Shaw
Attorney, Agent, or Firm—Finnegan, Henderson, Farabow, Garrett & Dunner

[57] ABSTRACT

A full adder is disclosed which comprises a first exclusive OR circuit for OR processing a first input signal and a second input signal, a second exclusive OR gate for OR processing an output signal of the first exclusive OR gate and a third input signal, and select circuit for selecting one of the first and second input signals and the third input signal according to a logical level of the output signal of the first exclusive OR gate. A sum signal of the first to third input signals, is obtained by the first exclusive OR means and the second exclusive OR means. The select means selects either the first or second input signal or the output signal of the third input signal according to a logical level of the output signal of the first exclusive OR means. The selected signal is used as a carry signal.

2 Claims, 9 Drawing Figures

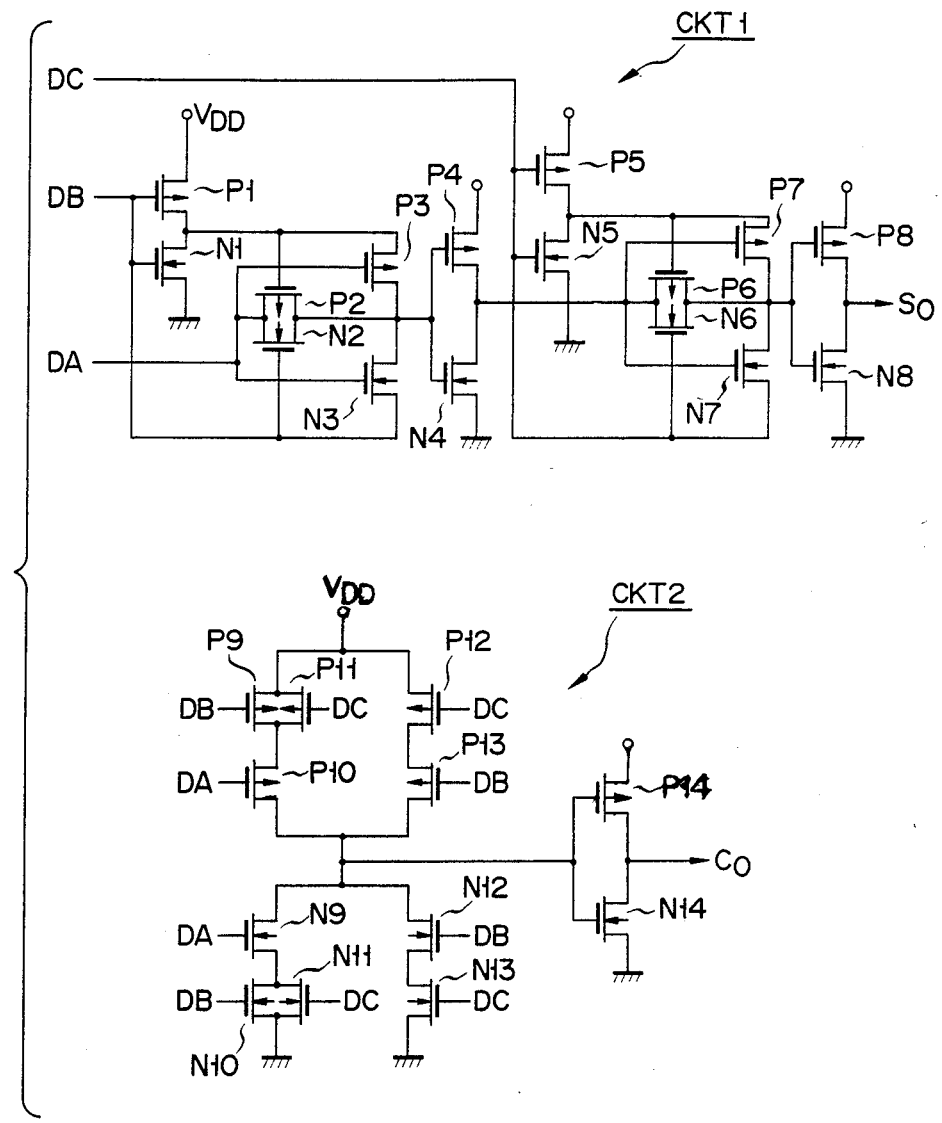
F I G. 1

FIG. 2
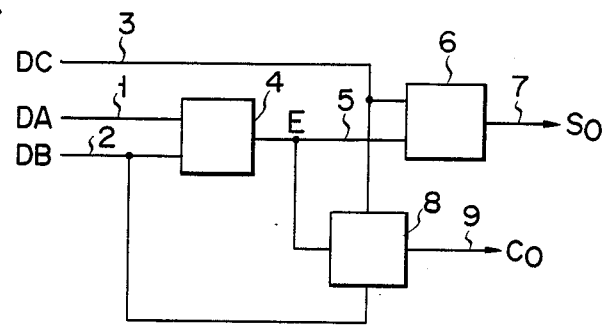
FIG. 3
| INPUT SIGNAL | | | GATE 4 OUTPUT SIGNAL | SUM SIGNAL | CARRY SIGNAL |
|---|---|---|---|---|---|
| DC | DB | DA | E | S$_O$ | C$_O$ |
| 0 | 0 | 0 | 0 | 0 | 0 |
| 0 | 0 | 1 | 1 | 1 | 0 |
| 0 | 1 | 0 | 1 | 1 | 0 |
| 0 | 1 | 1 | 0 | 0 | 1 |
| 1 | 0 | 0 | 0 | 1 | 0 |
| 1 | 0 | 1 | 1 | 0 | 1 |
| 1 | 1 | 0 | 1 | 0 | 1 |
| 1 | 1 | 1 | 0 | 1 | 1 |
FIG. 4
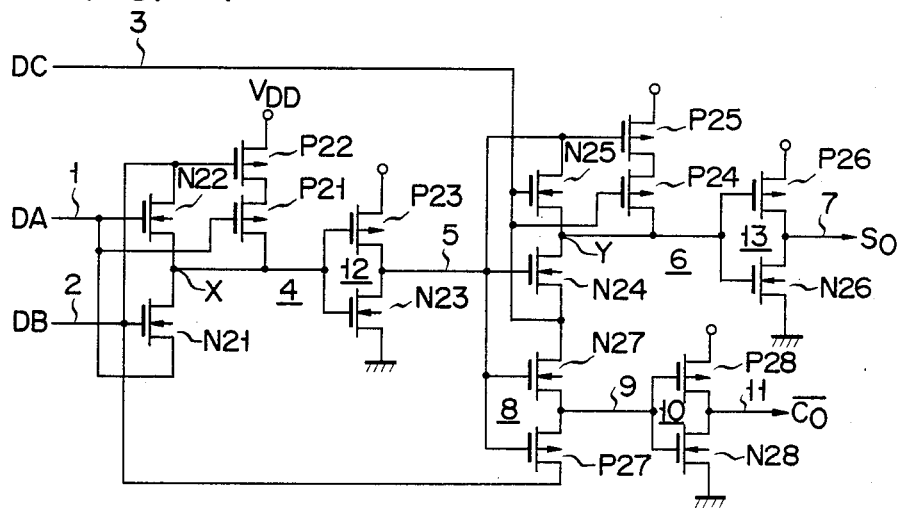

| INPUT SIGNAL | | | SUM SIGNAL | CARRY SIGNAL |
|---|---|---|---|---|
| DA | DB | DC | $S_O$ | $C_O$ |
| 0 | 0 | 1 | 1 | 0 |
| 1 | 1 | 0 | 0 | 1 |

| INPUT SIGNAL | | | SUM SIGNAL | CARRY SIGNAL |
|---|---|---|---|---|
| DA | DB | DC | $S_O$ | $C_O$ |
| 0 | 1 | 0 | 1 | 1 |
| 1 | 0 | 1 | 0 | 0 |

FULL ADDER

BACKGROUND OF THE INVENTION

The present invention relates to a three-input full adder used in an arithmetic logic unit (ALU), a multiplexer, and the like.

FIG. 1 shows a prior full adder constructed using complementary metal oxide semiconductor field effect transistors (CMOS FETs). The full adder is made up of a first circuit block CKT1 for forming a logical sum signal So of three input signals DA, DB and DC and a second circuit block CKT2 for forming a carry signal Co as the result of a logical processing of the three input signals DA, DB and DC. The first circuit block CKT1 is composed of p-channel MOS FETs P1–P8 and n-channel MOS FETs N1–N8. The second circuit block CKT2 is comprised of p-channel MOS FETs P9–P14 and n-channel MOS FETs N9–N14. The sum signal So and the carry signal Co of the three input signals, DA, DB and DC are given by the following logical formula $$So = DA \oplus DB \oplus DC$$
$$Co = DA \cdot DB + DB \cdot DC + DC \cdot DA$$

where $\oplus$ indicates an exclusive logical sum, "·" a logical product, and "+" a logical sum. Since the input signals are applied to a number of MOS FETs to drive them, the load of the input signals is heavy, thus hindering the speed of the operation.

As described above, the prior full adder composed of CMOS FETs requires a number of circuit elements, making the circuit complicated. Therefore, the density of circuit integration when the circuit is implemented by an IC module cannot be improved. Further, because of the heavy load of the input signals, it is difficult to speed up the operation of the full adder.

SUMMARY OF THE INVENTION

Accordingly, an object of the present invention is to provide a full adder which has a simple circuit arrangement with fewer FETs, thereby allowing high density integration, and which also has a light load of input sugnals, thus allowing high speed operation.

According to the invention, there is provided a full adder comprising:

first exclusive OR processing means for OR processing a first input signal and a second input signal;

second exclusive OR processing means for OR processing an output signal of said first exclusive OR processing means and a third input signal;

select means for selecting one of said first and second input signals and said third input signal DC according to a logical level of the output signal of said first exclusive OR processing means;

whereby a sum signal of said first, second and third input signals from said second exclusive OR processing means and a carry signal are taken out from said select means.

BRIEF DESCRIPTION OF THE DRAWINGS

FIG. 1 shows circuit diagrams of a prior full adder;

FIG. 2 is a block diagram illustrating a basic configuration of a full adder of the present invention;

FIG. 3 is a table showing logical levels at key portions of the full adder shown in FIG. 2;

FIG. 4 is a circuit diagram of an embodiment of the invention in which CMOS FETs are used for constructing the full adder schematically illustrated in FIG. 2;

DETAILED DESCRIPTION OF THE PREFERRED EMBODIMENTS

Figure 5:
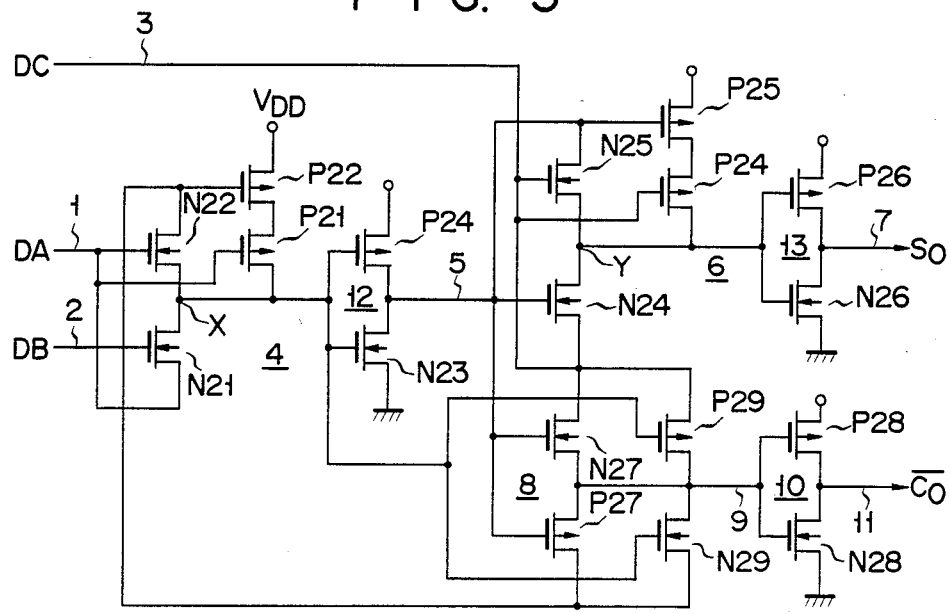
FIGS. 5 and 6 shown circuit diagrams of other embodiments of the invention in which the full adder of FIG. 2 is constructed using CMOS FETs.

FIG. 2 illustrates in block form a full adder according to the present invention. In the figure, reference numerals designate input signal lines through which input signals DA, DB and DC are applied. The input signal lines 1 and 2 are respectively connected to the input terminals of a first two-input exclusive OR gate 4. The input signals DA and DB are input through the input signal lines 1 and 2, respectively to the input terminals of the first exclusive OR gate 4. The input signals DA and DB are supplied to the first exclusive OR gate 4 which produces an exclusive OR signal.

The input signal line 3 is connected to a first input terminal of a second two-input exclusive OR gate 6. The input signal DC is applied through the input signal line 3 to the second input terminal of the second two-input exclusive OR gate 6. The output terminal of the first exclusive OR gate 4 is connected to the second input terminal of the second two-input exclusive OR gate 6 via an output signal line 5. An output exclusive OR signal E of the first exclusive OR gate 4 is applied to the second input terminal of the second two-input exclusive OR gate 6. The two input signals are supplied to the second two-input exclusive OR gate 6 which produces a signal So, which in turn is derived through the output line 7. The exclusive OR signal So is the sum signal of the three input signals DA, DB and DC.

The input signal lines 2 and 3 are respectively connected to the first and second input terminals of a select circuit 8. The input signals DB and DC are input to these input terminals of the select circuit 8 via the input signal lines 2 and 3, respectively. An output signal line 5 of the first exclusive OR gate 4 is connected to the control terminal of the select circuit 8. The first output exclusive OR signal E is applied as a control signal to the control terminal of the select circuit 8, via the output signal line 5. The select circuit 8 selects one of the input signals DB and DC according to the logical level of the first exclusive OR signal E applied to the control terminal. When the first exclusive OR signal E is logical "1", the select circuit 8 selects the input signal DC. When it is logical "0", the select circuit 8 selects the input signal DB. The signal selected is taken out as a carry signal Co via the output signal line 9.

In the full adder thus arranged, the first exclusive OR gate 4 OR processes the input signals DA and DB, and when the logical levels of these signals are different from each other produces a first exclusive OR signal E of logical "1". The second two-input exclusive OR gate 6 OR processes the input signal DC and the exclusive OR signal E, and when these input signals have different logical levels produces an exclusive OR signal So equal to "1". A situation in which the input signals DC and E have different logical levels results when one or all of the input signals DA, DB and DC is logical "1". In this situation, the output signal So from the second two-input exclusive OR gate 6 is logical "1".

The carry signal Co of the select circuit 8 is logical "1" when two of the input signals DA, DB and DC are logical "1". Incidentally, the carry operation is performed upon a valid logical level "1" of the carry signal Co. Two or more input signals are logical "1" in the following four situations.

(1) DA="1", DB="1", DC="0"
(2) DA="1", DB="0", DC="1"
(3) DA="0", DB="1", DC="1"
(4) DA="1", DB="1", DC="1"

In situations (2) and (3) above, the exclusive OR signal E of the first exclusive OR gate 4 is logical "1". In this case, the select circuit 8 selects the input signal DC, so that the carry signal Co is logical "1".

In situations (1) and (4) above, the exclusive OR signal E of the first exclusive OR gate 4 is logical "0". At this time, the select circuit 8 selects the input signal DB, so that the carry signal Co is logical "1".

Turning now to FIG. 4, there is shown a practical circuit arrangement of the full adder of FIG. 3 when the adder is constructed using CMOS FETs. As shown, the first exclusive OR gate 4 is made up of p-channel MOS FETs P21–P23 and n-channel MOS FETs N21–N23. The second two-input exclusive OR gate 6 is made up of p-channel MOS FETs P24–P26 and n-channel MOS FETs N24–N26. The select circuit 8 is composed of a p-channel MOS FET P27 and n-channel MOS FET N27. Further, a CMOS inverter 10 is a buffer comprised of a p-channel MOS FET P28 and an n-channel MOS FET N28 and is provided at the output stage of the select circuit 8. The carry signal Co is taken out from an output line 11 in the form of an inverted signal $\overline{Co}$.

The first exclusive OR gate 4 has the following circuit connection. The two MOS FETs N21 and N22 are connected to each other at their output paths to form a series connection. The other end of the output path of the MOS FET N21 and the gate of the MOS FET N22 are connected together and also connected to the input signal line 1. Similarly, the other end of the output path of the MOS FET N22 and the gate of the MOS FET N21 are both connected to the input signal line 2. A pair of MOS FETs P22 and P21 are inserted between a power source $V_{DD}$ (corresponding to logical "1") with positive polarity and a node X of the MOS FETs N21 and N22. The gate of the MOS FET P22 is connected to the input signal line 2 and the gate of the MOS FET P21 to the input signal line 1. The MOS FETs P23 and N23 are connected in series between the power source $V_{DD}$ and ground (corresponding to logical "0"), thereby forming a CMOS inverter 12. The gates of the MOS FETs P23 and N23 are both connected to the node X of the MOS FETs N21 and N22.

The second two-input exclusive OR gate 6 has the following circuit connection. A pair of MOS FETs N24 and N25 are interconnected at the ends of their output paths to form a series connection. The other end of the output path of the MOS FET N24 and the gate of the MOS FET N25 are both connected to the input signal line 3. The other end of the output path of the MOS FET N25 and the gate of the MOS FET N24 are both connected to the output signal line 5. The MOS FETs P25 and P24 are connected in series between the power source $V_{DD}$ and a node Y of the MOS FETs N24 and N25. The gate of the MOS FET P24 is connected to the input signal line 3 and the MOS FET P25 to the output line 5. The MOS FETs P26 and N26 are connected in series between the power source $V_{DD}$ and ground, thereby forming a CMOS inverter 13. The gates of the MOS FETs P26 and N26 are both connected to the node Y.

The circuit connection of the select circuit 8 is constructed as follows. The ends of the output paths of the MOS FETs P27 and N27 are interconnected to form a series connection. The other end of the output path of the MOS FET P27 is connected to the input signal line 2 and the other end of the output path of the MOS FET N27 to the input signal line 3. The gates of the MOS FETs P27 and N27 are both connected to the output signal line 5.

The MOS FETs P28 and N28 are connected in series between the power source $V_{DD}$ and ground, thereby forming the CMOS inverter 10. The junction of the MOS FETs N27 and P27 is connected to the gates of the MOS FETs P28 and N28 of the CMOS inverter 10. The signal $\overline{Co}$ is taken from the junction of the CMOS inverter 10.

The operation of the circuit of FIG. 4 will now be described.

The first exclusive OR gate 4 produces an exclusive OR signal by OR processing the input signals DA and DB in the following manner. When the input signals DA and DB are both logical "0", the MOS FETs N21 and N22 are off, and the MOS FETs P21 and P22 are on. In this case, the node X is set at logical "1" by the MOS FETs P21 and P22 in an on state. The logical "1" at the node X is inverted by the inverter 12 and an exclusive OR signal E appears on the output signal line 5. When the input signals DA and DB are both logical "1", the MOS FETs N21 and N22 are both on, while the MOS FETs P21 and P22 are off. The on state of the MOS FETs N21 and N22 and the logical "1" of the signals DA and DB place the node X at logical "1". The logical "1" at the node X is inverted, so that an exclusive OR signal E of logical "0" appears on the output signal line 5 connected to the inverter 12. When the logical levels of the input signals DA and DB are different, either of the MOS FETs P21 and P22 is turned off, so that the series circuit of the MOS FETs P21 and P22 is rendered nonconductive. As a result, the node X is set to logical "1" by the power source $V_{DD}$ through this series circuit. In this case, if the input signal DA is logical "1" and the input signal DB is logical "0", the MOS FET N21 is turned off, while the MOS FET N22 is turned on. Accordingly, the logical "0" input signal DB is transferred through the MOS FET N22 in an on state to the node X. The logical "0" signal is inverted by the inverter 12 and hence, a logical "1" signal E appears on the output line 5. Conversely, when the input signal DA is logical "0" and the input signal DB is logical "1", the MOS FET N21 is turned on and the MOS FET N22 is turned off. In this case, the logical "0" input signal DA is transferred to the node X through the MOS FET N21 in an on state. The logical "0" signal is inverted by the inverter 12, so that a logical "1" signal E appears on the output signal line 5.

In this way, the first exclusive OR gate 4 produces the exclusive OR signal of the input signals DA and DB. In a similar manner, the second two-input exclusive OR gate 6 produces an exclusive OR signal of the input signals DC and E.

The select circuit 8 selects one of the two signals in the following manner. When the input signals DA and DB are both logical "0" or logical "1", the exclusive OR signal E on the output signal line 5 is logical "0". In this case, the MOS FET P27 is turned on, while the MOS FET N27 is turned off. As a result, the input signal DB is transferred as a carry signal Co to the output signal line 9 through the MOS FET P27 in an on state. In this way, the input signal DB is selected. When the input signals DA and DB are both logical "1", the logical "1" input signal DB is transferred to the output signal line 9, so that the carry operation is performed. When the input signals are both logical "0", the logical "0" input signal DB is transferred to the output signal line 9. In this case, no carry operation is performed.

When the input signals DA and DB have different logical levels, the exclusive OR signal E of the first exclusive OR gate 4 is logical "1". In this case, the MOS FET P27 is off and the MOS FET N27 is on. As a result, the input signal DC is transferred as a carry signal Co to the output signal line 9. When the input signal DC is logical "1", the carry operation is performed, while when it is logical "0", no carry operation is performed.

In the embodiment of FIG. 4, the number of the MOS FETs required for full adder formation is considerably reduced, that is, only 16, as compared with 28 MOS FETs required in the prior art. This reduction is highly desirable in fabricating the full adder using IC technology. Further, in the full adder of FIG. 4, only four MOS FETs need to be driven by the input signals DA, DB and DC while the prior art requires six. In this respect, the load to the input signals is remarkably lessened.

FIG. 5 shows a practical circuit arrangement of another embodiment of the present invention. In this arrangement, a p-channel MOS FET P29 is connected in parallel with a MOS FET N27 and an n-channel MOS FET N29 is connected in parallel with a MOS FET P27. Except for this connection the remaining arrangement is the same as in the embodiment of FIG. 4.

In the present embodiment, the select circuit 8 is comprised of a first parallel circuit including MOS FETs N27 and P29 and a second parallel circuit including MOS FETs P27 and N29.

The MOS FETs P29 and N29 are connected at the gates to a node X of the MOS FETs N21 and N22. The inverted signal of an exclusive OR signal E on the output signal line 5, that is, an input signal to the CMOS inverter 12, is applied to the gates of the MOS FETs P29 and N29.

In this embodiment, when the MOS FET is turned on, the MOS FET P29 is also turned on simultaneously. When the MOS FET P27 is turned on, the MOS FET N29 is also turned on. In this operation, the voltage drops corresponding to the threshold voltages of the MOS FETs N27 and P29 cancel out, because the CMOS FET P29 is connected across the MOS FET N27. Further, since the CMOS FET N29 is connected across the MOS FET P27, the voltage drops corresponding to the threshold voltages of the MOS FETs P27 and N29 cancel out. Therefore, if the signal on the output signal line 9 is logical "1", this signal level is set much closer to the power source $V_{DD}$ level. On the other hand, if it is logical "0", the signal level is set much closer to the ground level.

The number of MOS FETs used in this embodiment is 18, 2 larger than that in the embodiment of FIG. 4. It should be noted, however, that this number is still much smaller than that of the prior art of FIG. 1.

In an adder, a multiplier or the like having a plurality of full adders incorporated therein, a sum signal and a carry signal produced from each stage of the full adder are generally applied to the full adder of the succeeding stage.

Figure 6:
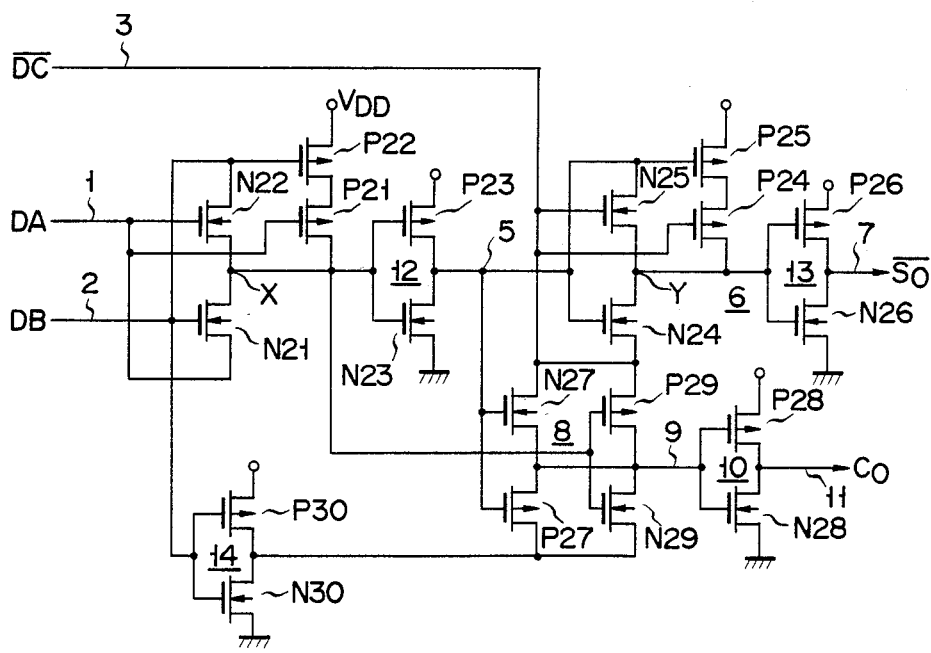

FIG. 6 shows another embodiment of the present invention which is suitable for the multi-stage connection as just mentioned. In this embodiment, the input signal DC is level-inverted to become a signal $\overline{DC}$ and is applied to the circuit. The sum signal is the inverted signal $\overline{So}$ of the signal So. The sum signal $\overline{So}$ is applied as the input signal $\overline{DC}$ to the full adder of the succeeding stage. To level-match the input signal DB to the inverted input signal $\overline{DC}$, a CMOS inverter 14 composed of a p-channel MOS FET P30 and an n-channel MOS FET N30 is provided at the input of the select circuit 8. The remaining circuit arrangement, except for the above connection, is the same as that of the embodiment of FIG. 5, and so no further explanations will be given.

This embodiment is particularly suitable for a multi-stage circuit arrangement in which a sum signal $\overline{So}$ in a preceding stage is used as an input signal $\overline{DC}$ for the succeeding stage. More specifically, if we consider the three input signals DA, DB and $\overline{DC}$ with regard to the time from the instant that each is applied to the input signal lines 1 to 3 until it reaches the select circuit 8, the interval of the input signal $\overline{DC}$ is shortest. In other words, the input signal $\overline{DC}$ first reaches the select circuit 8, but it must then wait until the first exclusive OR gate 4 produces the exclusive OR signal E. The longer the wait time, the slower the operation of the circuit. In the FIG. 6 embodiment, the sum signal $\overline{So}$ is produced following the carry signal Co. The arrangement that the sum signal $\overline{So}$ of the preceding stage is applied as the input signal $\overline{DC}$ to the succeeding stage, reduces the wait time of the sum signal $\overline{So}$ in the select circuit 8, thus leading to a speeding-up of the circuit operation.

In this embodiment, the number of required MOS FETs is 20, which is still considerably smaller than the 28 elements required in the prior art.

In the prior circuit of FIG. 1, the input signals DA, DB and DC, the sum signal So and the carry signal, Co are ruled under the positive logic in which logical "1" is valid for the carry operation. It is evident, however, that a negative logic may be adopted in place of the positive logic if necessary.

Figures 7, 8, 9:
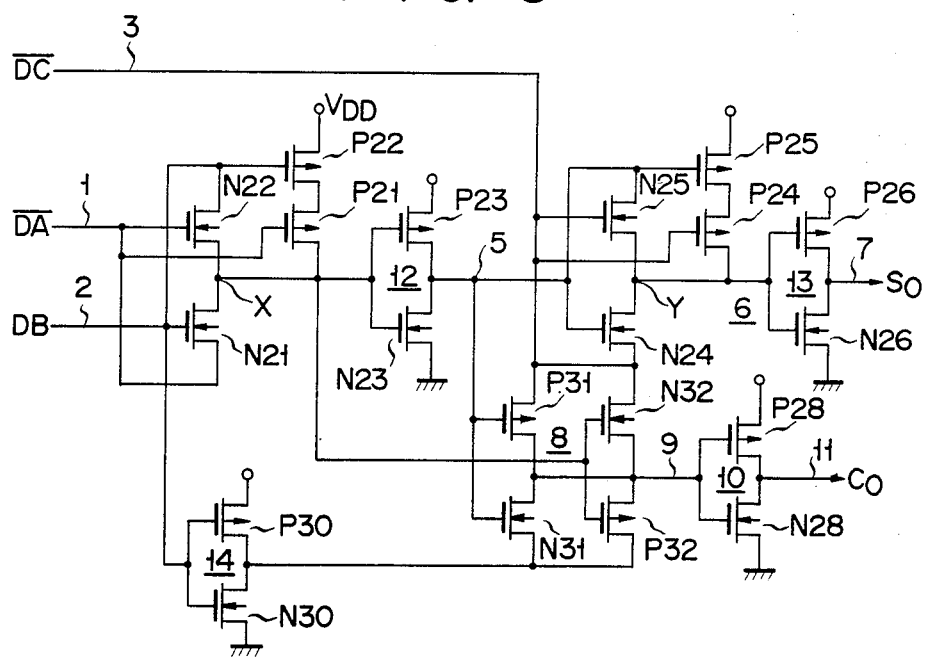
FIG. 7 is a table illustrating logical levels at key portions in the full adder of FIG. 6.
FIG. 8 is a circuit diagram of another embodiment of a full adder according to the present invention.
FIG. 9 tabulates a logical relation among key portions in the circuit of FIG. 8.

For example, in the embodiment of FIG. 6, as shown in FIG. 7, the input signals DA, DB and DC may be combined with different logic levels. When the input signals DA, DB and DC are set to logical "0", logical "0", and logical "1", respectively, the sum signal So and the carry signal Co are set to logical "1" and logical "0", respectively. Further, when these input signals are set to logical "1", logical "1" and logical "0", respectively, the sum signal So and the carry signal Co are logical "0" and logical "1", respectively.

As shown in FIG. 8, the p-channel MOS FETs P27 and P29 in the select circuit 8 in the FIG. 6 embodiment are replaced by n-channel MOS FETs N31 and N32, and the n-channel MOS FETs N27 and N29 are replaced by p-channel MOS FETs P31 and P32, respectively. With the replacement of the MOS FETs, the input signals are combined with the logical levels as shown in FIG. 9. For example, the input signals DA, DB and DC may be set to logical "0", logical "1" and logical "0", respectively. In this case, the sum signal So and the carry signal Co are both logical "1". Further, the input signals DA, DB and DC may be set to logical "1", logical "0" and logical "1", respectively. In this case, the sum signal So and the carry signal Co are both logical "0".

The use of CMOS FETs for the full adder is preferable in consideration of the fact that the select circuit 8 for gaining the carry signal Co is controlled by a single control signal. As described above, according to the present invention the full adder is constructed using CMOS FETs, and the number of circuit elements is reduced, thus enabling the adder to be fabricated into the IC module. Further, the load to the input signals is lessened, and this feature allows a high speed operation of the full adder.

It should be understood that the present invention is not limited to the above-mentioned embodiments, but may be variously changed and modified within the scope of the invention.

What is claimed is:

1. A full adder coupled to first and second power source terminals, having as inputs first through third input signals, and producing a sum signal and a carry signal, said adder comprising:
    (a) first exclusive OR processing means receiving as inputs said first and second input signals, said first exclusive OR processing means including
        (i) a first MOS transistor of a first channel type having a gate and a current path, said gate receiving said first input signal,
        (ii) a second MOS transistor of said first channel type having a gate and a current path, said gate of said second MOS transistor receiving said second input signal and said current paths of said first and second transistors being connected in series between said first and second input signals,
        (iii) a third MOS transistor of a second channel type having a gate and a current path, said gate of said third MOS transistor receiving said second input signal,
        (iv) a fourth MOS transistor of a second channel type having a gate and a current path, said gate of said fourth MOS transistor receiving said first input signal and said current path of said third and fourth MOS transistors being connected in series between said first power source terminal and the interconnection of said first and second MOS transistors, and
        (v) a first inverter including fifth and sixth MOS transistors each having a gate connected to said interconnection of said first and second MOS transistors, and said fifth and sixth MOS transistors each having a current path which are connected in series between said first power source terminal and said second power source terminal;
    (b) second exclusive OR processing means receiving as inputs said third input signal and a signal at the interconnection of said fifth and sixth MOS transistors for producing said sum signal corresponding to the logical sum of said first, second, and third input signals; and
    (c) means for selecting one of said second and third input signals according to said signal appearing at said interconnection of said fifth and sixth MOS transistors, thereby to produce said carry signal.

2. The full adder according to claim 1 wherein said second exclusive OR processing means comprises:
    (a) a seventh MOS transistor of said first channel type having a gate and a current path, said gate of said seventh MOS transistor receiving said third input signal;
    (b) an eighth MOS transistor of said first channel type having a gate and a current path, said gate of said eighth MOS transistor receiving said signal appearing at said interconnection of said fifth and sixth MOS transistors, said current paths of said seventh and eighth MOS transistors being connected in series between said third input signal and said interconnection of said fifth and sixth MOS transistors;
    (c) a ninth MOS transister of said second channel type having a gate and a current path, said gate of said ninth MOS transistor receiving said signal appearing at said interconnection of said fifth and sixth MOS transistors;
    (d) a tenth MOS transistor of said second channel type having a gate and a current path, said gate of said tenth MOS transistor receiving said third signal and said current paths of said ninth and tenth MOS transistors being connected in series between said first power source terminal and the interconnection of said seventh and eighth MOS transistors; and
    a second inverter including eleventh and twelfth MOS transistors each having a gate and a current path, said gates of said eleventh and twelfth MOS transistors being connected to said interconnection of said seventh and eighth MOS transistors, and said current paths of said eleventh and twelfth MOS transistors being connected in series between said first power source terminal and said second power source terminal.

* * * * *

UNITED STATES PATENT AND TRADEMARK OFFICE
CERTIFICATE OF CORRECTION

PATENT NO. : 4,564,921

DATED : January 14, 1986

INVENTOR(S) : KAZUO SUGANUMA

It is certified that error appears in the above-identified patent and that said Letters Patent is hereby corrected as shown below:

On the front page of the patent please change the assignee information to -- Tokyo Shibaura Denki Kabushiki Kaisha, Kawasaki, Japan --

Signed and Sealed this

Ninth Day of December, 1986

Attest:

DONALD J. QUIGG

Attesting Officer

Commissioner of Patents and Trademarks